United States Patent
Marsden (10) Patent No.: US 11,617,086 B2
(45) Date of Patent: Mar. 28, 2023

(54) LOADING SECURITY INFORMATION WITH RESTRICTED ACCESS

(71) Applicant: Eseye Limited, Guildford (GB)

(72) Inventor: Ian Marsden, Lyne (GB)

(73) Assignee: Eseye Limited, Guildford (GB)

( * ) Notice: Subject to any disclaimer, the term of this patent is extended or adjusted under 35 U.S.C. 154(b) by 176 days.

(21) Appl. No.: 17/065,425

(22) Filed: Oct. 7, 2020

(65) Prior Publication Data
US 2021/0105615 A1    Apr. 8, 2021

(30) Foreign Application Priority Data

Oct. 8, 2019 (GB) ..................................... 1914530

(51) Int. Cl.
| | |
|---|---|
| H04M 1/66 | (2006.01) |
| H04W 12/72 | (2021.01) |
| H04W 12/0471 | (2021.01) |
| H04W 12/041 | (2021.01) |
| H04W 8/18 | (2009.01) |
| H04W 12/06 | (2021.01) |

(52) U.S. Cl.
CPC ........... *H04W 12/72* (2021.01); *H04W 8/183* (2013.01); *H04W 12/041* (2021.01); *H04W 12/0471* (2021.01); *H04W 12/06* (2013.01)

(58) Field of Classification Search
CPC ... H04W 12/06; H04W 12/08; H04W 12/069; H04W 12/72; H04W 12/041
See application file for complete search history.

(56) References Cited

U.S. PATENT DOCUMENTS

| | | | | |
|---|---|---|---|---|
| 2007/0004455 | A1* | 1/2007 | Wennberg | H04W 8/18 455/558 |
| 2010/0332832 | A1* | 12/2010 | Wu | H04L 9/3271 713/169 |
| 2014/0115676 | A1* | 4/2014 | Coghlan | H04W 12/069 726/6 |
| 2017/0357936 | A1* | 12/2017 | Byington | H04L 9/085 |
| 2018/0018184 | A1* | 1/2018 | Durnov | H04W 4/14 |
| 2018/0041541 | A1* | 2/2018 | Marsden | H04L 63/0823 |

FOREIGN PATENT DOCUMENTS

| | | | | |
|---|---|---|---|---|
| EP | 3280111 A1 | 2/2018 | | |
| WO | WO-2004019552 A1 * | 3/2004 | | G06F 21/10 |
| WO | WO-2005064430 A1 * | 7/2005 | | G06F 21/6245 |

OTHER PUBLICATIONS

GB1914530.9; Search Report; dated Jul. 6, 2020; 4 pages.
Oma, "Lightweight Machine to Machine Technical Specification: Core", pp. 1-142 URL: http://opoenmobilealliance.org/RELEASE/LightweightM2M/V I_1-20180612-C/OMA-TS-LightweightM2M Core-VI_I-20180612-C.pdf; Jun. 18, 2018; 142 pages.

\* cited by examiner

*Primary Examiner* — Shantell L Heiber
(74) *Attorney, Agent, or Firm* — Kilpatrick Townsend & Stockton LLP (57) ABSTRACT

An approach for providing security information to a device to enable the device to secure end-to-end data communication with an end server. The security information is downloaded to a SIM of the device in response to an authentication message issued by the device. The security information is secured within the SIM so that it can only be accessed/interpreted using a first key associated with the device. The securing is performed based on identity data, identifying the device or components thereof, contained in the authentication message.

20 Claims, 2 Drawing Sheets

LOADING SECURITY INFORMATION WITH RESTRICTED ACCESS

CROSS-REFERENCES TO RELATED APPLICATIONS

This application claims priority to United Kingdom Patent Application No. 1914530.9, filed Oct. 8, 2019. The entire contents of the foregoing patent application is incorporated herein in its entirety for all purposes.

FIELD OF THE INVENTION

The invention relates to methods of loading security information, such as keys and/or certifications, onto a device after manufacture, and apparatus adapted to carry out such methods.

BACKGROUND OF THE INVENTION

Many devices are manufactured in bulk, and it is then necessary to provide unique security material ("security information") in the device after manufacture, which security information may be in form of security certificates, secure communications software, private keys, encryption algorithms, server information, server settings, other security credentials and the like.

One approach is that a vendor of the devices provides such security information to the manufacturer (or another third party) for upload to each device in bulk. However, in this case, there is a risk that the vendor or other third party may treat the security information improperly, which may result in its leak or modification, thereby resulting in a loss of security. This approach also adds significant costs and complexity to a manufacturing process.

Therefore, it would be preferred for security information to be loaded onto the device after shipping the device to a customer or end-user, so that the required security information can be tailored to the customer's needs, activities and local laws without requiring the intervention of an intermediary (such as the vendor) or another third party. One approach could be to securely download the security information to the device using a quarantined network, in which the device can only communicate with a restricted number of other nodes, before de-quarantining the device.

There is an ongoing desire to reduce, mitigate or prevent unauthorized access to the security information.

SUMMARY OF THE INVENTION

The invention is defined by the claims.

According to examples in accordance with an aspect of the invention, there is provided a method of distributing, to a device, security information designed for encrypting end-to-end communication between the device and an end server, wherein the device comprises a subscriber identity module, SIM and a module that stores a first key.

The method comprises: sending an authentication message from the device to a home location register over a mobile network, wherein the authentication message comprises SIM identifying information, for identifying the SIM, and device identifying data associated with the device; and triggering, by the authentication message, steps of: registering the device on the mobile network based on the SIM identifying information; downloading of security information to the SIM over one or more signaling channels of the mobile network; storing the security information in the SIM; and modifying the SIM and/or the security information, based on the device identifying data contained in the authentication message, so that accessing and/or decrypting the security information stored by the SIM requires the first key.

Downloading the security information to the SIM card, but only permitting modules having the first key to access or decrypt the security information, reduces the chances of unauthorized access to the security information (e.g. by a unscrupulous third party attempting to read or gain access to the SIM).

The present invention provides a way of providing security information to a SIM of a device, but only enabling other components of that same device to access the security information (e.g. to communicate with an end server) if the other components of the device (i.e. the module) has been externally authorized to access/decrypt the security information. This can prevent, for example, security information from being extracted from the SIM (by a third party) and being used to clone the device or perform unauthorized communications with the end server.

By downloading the security information to the SIM, existing secure communications with a SIM can be exploited to ensure secure transfer of the security information to the device. Moreover, signaling channels can be used to download the security information, which means that the security information can be obtained out of band.

This effectively means that a device can be sold or shipped without any configuration or security credentials, and be bootstrapped to a secure network over air.

The step of modifying (i.e. reconfiguring) the SIM and/or security information is controlled by another device that is external to the device. The other device may, for example, be the home location register or another mobile network element able to communicate with the device over one or more signaling channels.

Thus, the securing of the security information in the SIM of the device is performed by a device of the mobile network, responsive to an authentication message received by the home location register and based upon device identifying data contained in said authentication message. This reduces the likelihood of a potentially unscrupulous third party attempting to access the security information by directly attacking the SIM.

The step of modifying the SIM and/or the security information is therefore controlled, defined and/or responsive to one or more devices of the mobile network over which the authentication message is sent. In other words, the step of modifying (i.e. reconfiguring) the SIM and/or the security message is performed using a device/system/module of the mobile network containing the home location register to which the authentication message is sent.

The inventor(s) has recognized that device identifying data contained in an authorization message (which is typical in the prior art) can be used to restrict access to security information stored by a SIM to a particular device. In particular, it is possible to associate each device with a certain (secret) first key, which can be used when encrypting the security information or restricting access to the (security information stored on the) SIM.

The method uses the relatively secure mobile standard connection (i.e. using one or more signaling channels) to download the security information. Downloading the security information in this way enables secure over-the-air processes (such as those defined by GSMA®) to be used. Methods of securely communicating with a SIM have been well-established in the art, and are exploited in the present invention to securely download security information to the SIM.

The end server is a final destination of the mobile network, i.e. a server or component that does not form part of the backbone or backhaul of the network.

The "security information" is distinct from a conventional session or ciphering key $K_c$, used for securing general communications between the device and the network, in that it is designed for "end-to-end" encrypting of communications between the device and a specific end server. The security information may, for example, comprise a "private key" for encrypting communications, a root certificate, endpoint URL, APN and the like.

The security information is preferably information designed for securing a communication at a non-physical layer, e.g. at an application layer. The security information may therefore be formatted or encoded in a suitable format for being parsed by an application (e.g. of a processor).

The module (storing the first key) may be configured to communicate with the end server at the application level. In particular, the module may be adapted to perform end-to-end encryption with the end server based on the security information. The security information may therefore be designed or formatted to be suitable for enabling end-to-end encryption at the application level. The module (storing the first key) may use the security information to set up or communicate over an application level data channel with the end server.

In embodiments, the step of triggering the downloading of security information comprises: triggering the generation of configuration data comprising the security information and SIM configuration data, the SIM configuration data being based upon the device identifying data; triggering the downloading of the configuration data, wherein the step of modifying the SIM or the security information comprises modifying the SIM, using the SIM configuration data, so that accessing the stored security information requires the first key.

Thus, the settings of the SIM can be modified by an external device to restrict access to the security information stored by the SIM. This embodiment relies on a concept of modifying settings of a SIM using out of band communications, i.e. over one or more signaling channels. This enables the relatively strong native encryption of a SIM to be exploited (to protect the security information) whilst allowing access to an authorized device, being the one first associated with the SIM.

The step of modifying the SIM may comprise modifying a read permission of the SIM to permit access to modules having an administrative, ADM, key, wherein the ADM key is obtainable using the first key, e.g. is set to be equal to the first key.

This step may comprise modifying an existing ADM key (found in standard SIMs) or creating a new ADM key (i.e. a new ADM key set for the SIM). The latter embodiment would help separate application security from normal SIM management.

The module may further adapted to store a second, different key and the step of modifying the SIM and/or the security information may further comprise encrypting the security information so that it can be decrypted using the second key. This embodiment helps improve the security of the security information by, for example, preventing other modules/devices authorized to access the SIM (but not having the second key) from decrypting the security information. This thereby provides a second level of security to the security information.

Of course, in some embodiments the step of modifying the SIM or the security information comprises encrypting the security information so that it can be decrypted using the first key. In some embodiments, any module (e.g. a third party) may be able to access the security information, but may be effectively unable to decrypt the security information without the first key. Such embodiments prevent the need for the SIM to be reconfigured to restrict access (as encryption may happen externally to the device), thereby simplifying an operation for the device with respect to the SIM.

Preferably, the module comprises a cellular modem of the device. This means that a cellular modem may obtain the security information required to communicate with the end server. This may take place at a non-physical level. In some embodiments, the cellular modem may be adapted to be capable of distributing the security information to other modules of the device, e.g. an application running on a processor.

Of course, in some embodiments, the module may comprise a processor adapted to obtain the security information from the SIM (e.g. via a direct connection to the SIM or via a modem connected to the SIM).

In some embodiments, the method further comprises accessing, using the module, the security information stored by the SIM using the first key; and storing the accessed security information in the module.

In further embodiments, the method comprises, after storing the accessed security information in the module, deleting the security information from the SIM. Thus, the security information may be deleted from the SIM to further reduce the likelihood of the security information being read or obtained from the SIM (e.g. by other devices having access to the SIM).

In other embodiments, the method comprises, after storing the security information in the module, using the module to attempt to contact the end server, wherein the attempt to contact is based upon the security information; and in response to successfully contacting the end server, deleting the security information from the SIM.

Thus, the security information may be deleted from the SIM in response to the module (e.g. a modem) successfully communicating with the end server. This ensures that the security information has been successfully received by the module before it is deleted.

The step of modifying the SIM and/or the security information may comprise: accessing a database that correlates different instances of device identifying data to different first keys; using the database to identify the first key that correlates to the device identifying data contained in the authentication message; and modifying the SIM and/or the security information based on the identified first key.

Thus, a database may correlate the device identifying data to a corresponding first key, which is then used to appropriately reconfigure or modify the SIM and/or the security information.

Preferably, the step of sending an authentication message from the device is performed on first power up of the device.

The security information may comprise a security certificate, secure communications software, a private key, an encryption algorithm, server information, server settings, or any combination of the foregoing. The method may further comprise initiating end-to-end encrypted communications with the end server based on the security information. In other words, an end-to-end communication between two endpoints of the mobile network takes place based on the security information.

In at least one embodiment, the step of modifying the SIM and/or the security information, based on the device identifying data, comprises modifying the SIM and/or the security information, based on the device identifying data, so that accessing and/or decrypting the security information stored by the SIM requires access to the first key and the SIM identifying information.

According to examples in accordance with an aspect of the invention, there is provided a mobile network system for distributing, to a device, security information designed for encrypting end-to-end communication between the device and an end server.

The mobile network system comprises: the device comprising a subscriber identity module, SIM, and a module that stores a first key; a home location register; an access point connected to a network having an end server; and wherein the device is adapted to: send an authentication message to the home location register, wherein the authentication message comprises SIM identifying information, for identifying the SIM, and device identifying data associated with the device; download the security information to the SIM over one or more signaling channels of a mobile network; wherein the home location register is adapted to trigger, by the authentication message: the registration of the device on the mobile network based on the SIM identifying information; the downloading of security information to the SIM over one or more signaling channels of the mobile network; the modification of the SIM and/or the security information, based on the device identifying data contained in the authorization message, so that accessing and/or decrypting the security information stored by the SIM requires the first key.

The module may comprise a cellular modem of the device.

In one embodiment, the mobile network system is adapted to trigger the downloading of security information by: triggering the generation of configuration data comprising the security information and SIM configuration data, the SIM configuration data being based upon the device identifying data; and triggering the downloading of the configuration data, wherein the modifying the SIM or the security information comprises modifying the SIM, using the SIM configuration data, so that accessing the stored security information requires the first key.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an approach for providing security information to a device to enable the device to secure end-to-end data communication with an end server. The security information is downloaded to a SIM of the device in response to an authentication message issued by the device. The security information is secured within the SIM so that it can only be accessed/interpreted by modules that have (access to) a first key associated with the device. The securing is performed based on identity data, identifying the device or components thereof, contained in the authentication message.

In the context of the present invention, the term "mobile network" is interchangeable with the term "cellular network", and refers to a communication network incorporating at least one wireless link. A mobile network operates according to a cellular technology, such as CDMA, GSM or the like.

Figure 1:
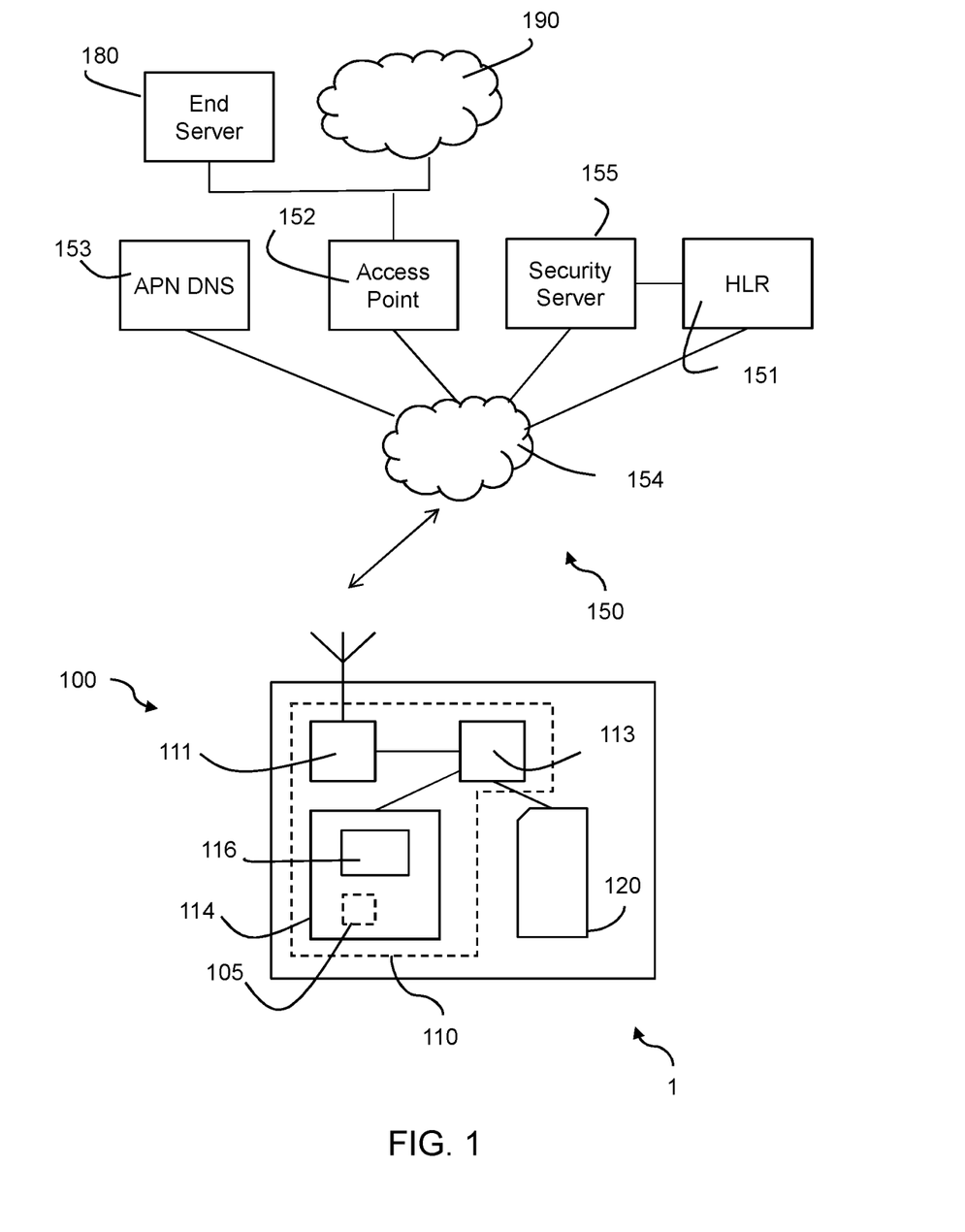
FIG. 1 illustrates a mobile network system according to an embodiment of the invention.

FIG. 1 illustrates a device 100, in the context of a mobile network system 1, according to an embodiment of the invention.

The device 100 is intended to securely communicate, using a mobile network 150, with an end server 180 and to provide data to that end server. It will be appreciated that there are many applications, for example data logging and smart meters, where devices require secure communication to an end server, and although such devices use the mobile/cellular network there is no need for the devices themselves to be mobile—they can and frequently are fixed in place as is for example the case with a smart meter.

In order to protect or define the data transfer between the device 100 and the end server 180, it is necessary for the device to access appropriate security information 105 to secure the end-to-end communications between the device 100 and the end server 180. In the illustrated example, the security information is (eventually) stored in a memory 114, but this is not essential.

Suitable examples of security information include a security certificate, secure communications software, a private key, an encryption algorithm, server information, server settings, or any combination of the foregoing. In particular examples, the security information may comprise a security certificate, a security key or both. By way of specific example only, security information could comprise a private key, root certificate, endpoint URL, an access point name or any combination of the foregoing or other similar examples of suitable security information.

The device 100 is manufactured and shipped without security information, meaning that it is not necessary to decide all details at the point of manufacture. For example, a smart meter may be manufactured for a number of utilities and it is only at point of use that it will be known which utility is installing the smart meter and hence the address of the end server and the required security information for securely communicating with the end server.

The device 100 includes a module 110 and a subscriber identity module (SIM) 120. In the present embodiment, the module 110 comprises a wireless/cellular modem 111, a processor 113 and a memory 114. The memory 114 may comprise software 116, which may alternately be labeled firmware, for execution by the processor 113.

The processor 113 is adapted to control the operation of the device 100, e.g. control data to be communicated to the end server.

The processor 113 may be adapted to handle the encryption of data to be communicated to the end server, e.g. using the security information. In another example, the security information may be used by the modem 111 to encrypt the communications to the end server.

The mobile network 150 is here a GSM mobile network. The mobile network 150 has a number of components, including a home location register (HLR) 151 and an access point 152, which in this example of a GSM mobile network is a gateway GPRS support node (GGSN) and a domain name server 153.

The home location register 151 registers or authorizes the device 100 to communicate on the mobile network 150, as later described. Specific components of the home location register (or components required for authorization), such as the authentication center, VLR and so on are omitted for the sake of clarity. The skilled person will appreciate that the home location register 151 is also able to perform other actions, as required, by the mobile network 150 (e.g. handling SMS delivery).

The access point 152 connects the end server 180 to the mobile network 150, and may connect other devices or network, such as the internet 190.

The device 100 may be configured, when attempting making a packet data connection, to make a request to access a single access point. This request involves making a request that includes an access point name (APN), typically hard-coded into the SIM 120. The domain name server 153 resolves the APN to direct the request to the access point 152.

Other conventional components of the mobile network are indicated schematically as 154 which is intended to represent a mobile base station and associated components to allow for SMS communication, USSD signaling, routing and also to permit packet data connection such as by including a serving GPRS support node (SGSN). Since these are conventional, they are not described in more detail. When a packet data connection is formed, the signal is received in the base station, the SGSN is responsible for communication with the device 100 through the base station, and the GGSN is responsible for communication onwards, for example to the public internet 190 or local servers, through network 154.

Note that these components may include components for international routing—i.e. it is not necessary for the device 100 to be in the same jurisdiction/territory as the access point 152 or the home location register 151. Any domain name server (DNS) will resolve the access point name into the location of the access point 152.

A security server 155 is provided to hold (or generate) security information centrally to download it to the device 100 as will be described below. The security server 155 may, for example, be able to communicate with a cloud-computing system (such as an AZURE® or AMAZON WEB SERVICES® based system) in order to perform certain processing tasks.

Initially, i.e. when it is first shipped, the device 100 is unable to securely perform end-to-end encrypted communications with the end server 180. This is because the security information required to perform end-to-end encrypted communications is not stored by the device 100.

There is therefore a need to provide the device 100 with appropriate security information so that it is able to perform end-to-end encrypted communications with the end server 180.

The present invention relates to a novel approach for providing such security information to a device 100.

In order to communicate using the mobile network 150, it is necessary to register the device 100 on the mobile network 150. This is performed by the device 100 sending an authentication message to the home location register 151. The authentication message includes SIM identifying information for identifying the SIM (such as an IMSI, ICCID and/or EID) and device identifying data associated with the device (such as MEI or IMEI). The device (in particular, the SIM of the device) is then registered to or activated on the mobile network 150 according to standard protocols, using the SIM identifying information.

Registration of a device 100 on a mobile network 150 is a well-established mechanism in the prior art. The present invention relates to additional steps performed in response to the authentication request.

The security server 155, in communication with the HLR 151, is triggered by the authentication request to generate the security information. The security information is then downloaded to the SIM of the device 100. The security information is downloaded using one or more signaling channels of the mobile network, i.e. it is downloaded "out-of-band". In this way, the security information is protected (during download) by the mobile telephony standard, e.g. the GSM standard.

The downloading of the security information (from the security server) may take place directly from the security server 155 via components 154 of the mobile network, or may be routed through the HLR 151.

In particular, whilst the modem 111 and processor 113 may encounter the security information as it is passed from the security server to the SIM, the security information is encoded using the GSM standard inherent to the use of signaling channels of a mobile network until it is decoded by the SIM and stored.

Downloading the security information in this way, over signaling channels, enables secure over-the-air processes (such as those defined by GSMA®) to be used. Methods of securely communicating with a SIM are well established in the art, and are exploited in the present invention to securely download security information to the SIM 120.

Thus, the security information is securely downloaded and stored by the SIM 120.

Note that the security information is not downloaded over a conventional secure data link for downloading, namely secure socket layer/transport security layer (SSL/TLS), since on first power up there are no certificates or keys on the device 100 and therefore the device is not at this stage set up to use SSL/TLS. It is clearly undesirable to download secure data without using SSL/TLS, in view of the risk of the data being intercepted.

In some embodiments, the security server 155 may be adapted to only generate and trigger the download of security information for certain instances of SIM identifying information and/or device identifying data. Thus, a predetermined set of SIM identifying information and/or device identifying data may be "whitelisted", meaning that it is permissible to prepare security information for said SIMs/devices.

Different security information may be provided to different SIMS, depending upon the SIM identifying information and/or the device identifying data.

However, there is a need for other components of the mobile device to access the security information (which is now stored by the SIM) in order to perform end-to-end encrypted communications, e.g. set up an encrypted data communication channel, with the end server. For example, an application running on the processor 113 may wish to use the security information to encrypt communications at a non-physical layer (e.g. the application level) or the modem 111 may be configured using the security information for end-to-end encryption.

Permitting access (to the SIM 120) could be performed by storing the security information in a plaintext format so that is can be readily accessed and used to encrypt messages to be sent to the end server 180. However, this approach makes it possible for the security information to be extracted from the SIM (as it is stored in plaintext) and used to clone the device 100.

There is therefore a need to secure the security information on the SIM 120 from unscrupulous third parties, whilst still allowing access to the security information to other elements of the device 100. It would also be desirable for these other elements to be able to access the security information stored in the SIM 120 automatically (i.e. without user/manual intervention).

The present invention exploits the content of the authentication message to ensure that only the device 100 sending the authentication message is able to access the security information.

The (module 110 of the) device 100 can store a first (secret) key, which can be effectively unique to that module/device. The security server 155 may be able to correlate or map the device identifying data, contained in the authentication message, to a version or copy of this first (secret) key (e.g. provided to the operator of the security server by a manufacturer of the device 100). The security information can then be secured (either at the SIM or before being downloaded to the SIM) using at least the first secret key. This ensures that only a device having the first key is able to access the security information.

The authentication message (or a portion thereof) may therefore be forwarded to the security server 155, so that the security server 155 can perform appropriate steps to secure the security information based on the device identifying data included in the authentication message. In particular, the home location register 151 may pass at least the device identifying data to the security server 155.

Of course, in some embodiments, the security server 155 is integrated into the home location register 151 itself or may be provided by a cloud-computing system, so that the security server can be controlled by the cloud provider.

A number of methods of securing the security information, so that it can only be accessed/read/decrypted by devices that have access to the first key, are envisaged.

One example exploits the recognition that a SIM typically has a number of standard features that help secure the contents of the card. In order to access/read the contents of the SIM, it is necessary to provide a PIN or key (e.g. an administrative (ADM) key). However, this PIN or key may not be automatically known by the other elements of the mobile device (as SIMs are normally separately installed within a pre-existing mobile device).

In response to the authentication message, the security server 151 may generate configuration data, comprising the security information and SIM configuration data/instructions. The configuration data is then downloaded to the SIM (e.g. pushed by the security server to the SIM), and the security information can be stored. The SIM configuration data changes the settings of the SIM so that access is permitted to modules that have access to the first key.

Changing the settings of the SIM may comprise, for example, setting an administrative (ADM) key to be equal to the first key (or a key derivable from the first key, such as a hash of the first key and one or more of the SIM identifying information and device identifying data, as described later) and permitting devices contacting the SIM, with the first key, read access to the security information. This may comprise modifying an existing ADM key or creating a new ADM key set for this purpose.

Changing the settings of the SIM may comprise updating an Access Rules Reference (ARR) file contained in the SIM, e.g. to change the read permissions of the SIM.

In another example, the security information can be encrypted (e.g. by the security server) so that it can (only) be decrypted by devices having access to the first key. Suitable encryption methods would be apparent to the skilled person. The encryption of the security information may, for example, be dependent upon decryption algorithms available to/on the module (of the device 100 that requires the security information).

The security information may be encrypted by the security server prior to being downloaded to the SIM. Conceivably, the SIM itself may be adapted to perform the encryption, although this is less preferable due to processing capabilities needed for encryption.

In a yet further example, both of these approaches are used, i.e. the settings of the SIM are changed appropriately and the security information is encrypted. This may be performed using the same first key (e.g. to prevent other modules that have access to the SIM, e.g. with different keys, from reading the security information) or using a first key (for changing the settings of the SIM) and a second, different key (for encrypting the security information). The first and second key may be stored by the (module 110 of the) mobile device. For the sake of conciseness, reference to a "first key" used throughout this application may therefore be replaced by reference to a "first and second, different key" where appropriate, i.e. when both an adjustment to SIM settings and encryption of the security information is performed.

The device identifying data of the mobile device 100 may be associated with a particular element of the device 100, such as the modem 111 or the processor 113. Put generally, the device identifying data is associated with a module 110, which may comprise one or more of the (non-SIM) elements of the device 100.

Device identifying data may comprise any suitable identifier of the device (or module), such as a unique number assigned to the device (or module). A suitable example of device identifying data includes an International Mobile Equipment Identity (IMEI) or a Mobile Equipment Identifier (MEI). Other suitable unique identifiers will be apparent to the skilled person, and may differ for different network standards.

In embodiments in which the security information is encrypted, the other elements of the device preferably comprise a secure storage (i.e. the memory 114), so that the security information is not stored in the device in an insecure fashion. This improves the security of the security information.

In some embodiments, the module 110 is adapted to obtain the security information using the first key and store the security information (e.g. in a secure storage 114).

To further improve security, once the module 110 stores the security information, the security information stored by the SIM 120 may be deleted. For example, this step prevents an unscrupulous user or third party from removing the SIM and attempting to perform a brute force attack to obtain the security information. Performing this optional step also helps reduce a memory usage of the SIM.

Of course, the operation of the module performed upon reading/obtaining the security information from the SIM may depend upon the content of the security information. In one example, the security information comprises instructions for setting desired security settings, which can be executed by the module to set its own security settings based on the security information. In another example, the security information comprises an encryption key for encrypting communications between the device 100 and the end server 18, which necessitates the storage of the encryption key in the device 100.

Thus, accessing the security information may comprise one or more steps of: copying (a portion of) the security information; executing (a portion of) the security information; processing (a portion of) the security information and so on. In other words, accessing the security information may comprise acting upon the security information in order to enable secured end-to-end encrypted communications (or secure an end-to-end data communication) between the first device 100 and the end server 180.

The security information stored on the SIM may be deleted after the module acts upon the security information.

In some embodiments, after the module accesses the security information, the device 100 may attempt to contact the end server based on the security information, i.e. establish end-to-end encrypted communication (i.e. a secure end-to-end data connection) with the end server. In other words, the module may attempt to open an encrypted data channel with the end server.

In response to successfully establishing end-to-end encrypted communication, the security information stored by the SIM may be deleted (as it is no longer required), in order to improve security.

In this embodiment, deletion of the security information on the SIM may be achieved by the end server communicating with the security server, in response to which the security server sends additional instructions to the SIM (via one or more signaling channels) to delete the stored security information. Again, it is emphasized that over-the-air protocols, such as those provided by the GMSA standard, can be used to secure or encrypt the additional instructions so that the additional instructions are safely communicated to the SIM in the same manner as the security information. This prevents unauthorized parties from requesting the deletion of security information from the SIM.

Other methods of deleting security information on the SIM would be apparent to the skilled person. For example, deletion of the security information may be triggered by the module of the device 100 sending an instruction to the SIM. In this example, the SIM should be adapted to receive one or more instructions from the module of the device. There may only be a limited set of instructions that the module is permitted to have executed by the SIM, e.g. only permitting the module to trigger deletion of the security information. This restriction or setting can be controlled by the security server (e.g. alongside the original transmission of the security information).

To improve the security of the device 100, before authentication of the device 100 on the mobile network, it may be configured to operate in a quarantine mode, in which the device has no data path enabled (except possibly to a restricted set of one or more servers, such as the security server 155) and will not be allowed to connect generally until the security information has been downloaded.

In particular, when operating in the quarantine mode the device 100 may be unable to communicate with any devices outside of the mobile network (e.g. including the end server or other devices connected to the mobile network via the internet).

The quarantine mode may be provided at the mobile network level for security, i.e. the functionality may simply not be implemented in the device to avoid the risk that the SIM will be removed and placed in a different device.

The quarantine state can be implemented by the response of the access point 152 (e.g. a GGSN) to a request from the device to access a network. The access point contains code to determine whether a device requesting access, possibly via the internet, to a particular server connected to the access point (e.g. the end server) is in a quarantine state. The test as to the state of the device may be simply checking a list of devices that have security information downloaded (e.g. provided by the security server). If the device is determined to be in a quarantine state, the GGSN may refuse to connect the device 100 to the end server. In one embodiment, this refusal is achieved by restricting the device to communicating only within the mobile network 150. In another embodiment, this is achieved by only permitting the device to communicate with a restricted set of one or more servers (not including the end server) connected to the access point (e.g. trusted or whitelisted servers), i.e. operating on a sub-network.

Thus, in a quarantine state, the device 100 may be placed in a sub-network where no access is possible to either end server 180 nor to the general internet 190.

In response to the downloading of the security information to the device 100, the device may be taken out of the quarantine state and placed in an operation state, to enable the device 100 to communicate with at least the end server 180.

Thus, placing the device 100 in the operation state can be triggered by the successful downloading of the security information to the device 100.

Switching the device 100 to an operation state may be performed by the access point enabling access, by the device, to at least the end server. In some embodiments, this may comprise enabling the device to access any device connected to the access point 152 or to only a whitelisted set of devices (including the end server).

Notification of successful download of the security information to the device 100 may be performed by, for example, the device 100 sending a message to the security server 155 (via the one or more signaling channels) when the security information is stored in the SIM or after the module 110 has accessed the security information stored in the SIM (and performed appropriate actions in response thereto, e.g. copying the security information or otherwise acting on the security information). The security server may then communicate with the access point to change the controlled state of the device.

Of course, the security server 155 may be adapted to update the security information even after the device 100 is authenticated on the network. This may be performed by the security server 155 triggering the download of new security information to the SIM (e.g. triggering the pushing of new security information to the SIM) over the one or more signaling channels. Over-the-air protocols, such as those provided by the GMSA standard, can thereby be used to secure or encrypt the new security information so that the new security information is safely communicated to the SIM in the same manner as the original security information.

A new download could be triggered in response to an update at the security server 155, e.g. to overcome a newly discovered exploit or to meet some new corporate policy.

The module 110 may be adapted to check the SIM for new security information. Checking may be performed periodically (e.g. once a day, week or month). Alternatively, checking could be triggered each time the module 110 opens a (application level) data channel with the end server 180 (e.g. wishes to begin transmitting information to the end server). In some embodiments, the check may be performed upon power up of the device 100 (e.g. if it has been switched off).

Previous embodiments have described how the security information can be securely stored, using the first key, on the SIM so that the stored security information can only be accessed/decrypted using the first key.

In some embodiments, the security information can be reconfigured or modified (e.g. by the security server) so that accessing/decrypting the stored security information further requires some additional information, such as the SIM identifying information and/or device identifying data (of the module or device).

In particular, the SIM identifying information and/or device identifying data transmitted in the original authentication request can be used to appropriately further encrypt or control access to the security information.

By way of example only, the security information may be configured so that accessing/decrypting the stored security information requires a hash of the first key and either or both of the SIM identifying information (e.g. ICCID) and device identifying data (e.g. IMEI). The module 110 may be adapted accordingly.

By way of example, the first key may be an input to a hashing function, with the SIM identifying information and/or the device identifying data acting as "salt" for the hashing function. The output of the hashing function may be used to encrypt or control access to the security information. Both the security server 155 and the module have access to the same hashing function, so that both elements are able to generate a same output (for encrypting/decrypting and/or restricting/gaining access to the security information).

Requiring the SIM identifying information to access/decrypt the security information means that the stored security information cannot be accessed if the original SIM (from initial authentication of the device) has been substituted, e.g. for a less secure SIM. This is particularly advantageous if the security information is encrypted using a hash of at least the first key and the SIM identifying information, as it will prevent third parties from using a substitute SIM in an effort to extract the security information.

In other words, the security information can be secured so that it can only be accessed by a device having the first key (set at manufacturing) and which contains a SIM that is the same as when the device was initially activated on the network. This effectively links the SIM 120 (which is typically removable/replaceable) and the module 110 of the device 100 together upon initial registration on the network, so that neither can be replaced in an effort to extract the security information.

Requiring the device identifying data to access/decrypt means that the first key is tied to a specific device, e.g. increasing a complexity for a third party should they attempt a brute force attack using a different device. This improves a security of the security information.

Of course, where a second key is used (e.g. for encryption of the security information) a similar approach may be used for the second key and the SIM identifying information and/or the device identifying data. The same or a different hashing function may be used.

In some embodiments, the module 110 is adapted to perform an authentication key check before opening or re-opening a communication channel with the end server and/or upon powering up and/or at periodic intervals. This effectively rechecks whether the SIM is authenticated to use the network 150. If the authentication check fails, then the SIM has potentially been substituted for an insecure one, and the device should refuse to open a connection to the network 150.

In some embodiments, checking for new security information (on the SIM) is performed only after the SIM has been (re)authenticated or it is (re)checked that the SIM is authorized to use the network 150.

Figure 2:
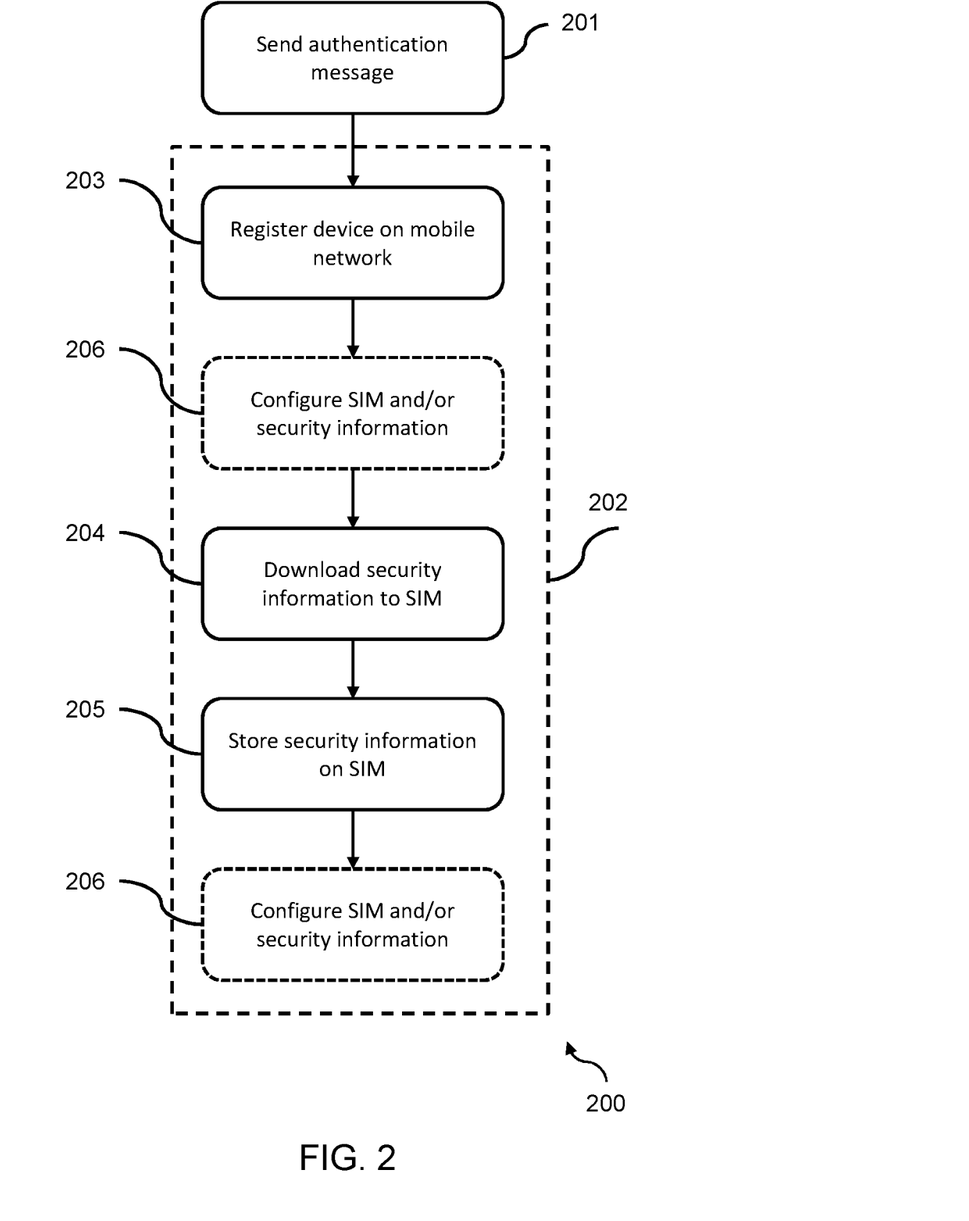
FIG. 2 illustrates a method according to an embodiment of the invention.

FIG. 2 illustrates a method 200 according to an embodiment of the invention.

The method 200 is adapted for distributing, to a device, security information designed for encrypting end-to-end communication between the device and an end server, wherein the device comprises a subscriber identity module, SIM and a module that stores a first key.

The method 200 comprises a step 201 of sending an authentication message from the device to a home location register over a mobile network, wherein the authentication message comprises SIM identifying information, for identifying the SIM and device identifying data associated with the device.

The method 200 further comprises a step 202 of triggering, by the authentication message, a first sub-step 203 of registering the device on the mobile network based on the SIM identifying information; a second sub-step 204 of downloading of security information to the SIM over one or more signaling channels of the mobile network; a third sub-step 205 of storing the security information in the SIM; and a fourth sub-step 206 of modifying the SIM and/or the security information, based on the device identifying data, so that the security information stored by the SIM can only be accessed and/or decrypted using the first key.

As illustrated, sub-step 206 may be performed before downloading the security information to the SIM (e.g. by performing encryption by the security server) or after the security information is downloaded to the SIM (e.g. by changing a read access of the SIM).

In the examples above, the security information is downloaded on first switching on and provisioning the device. However, the method may also be triggered later. In particular, the device, the network, or a user may detect a security threat and trigger the download of new/updated security information. In embodiments, this may comprise placing the device back in the quarantine mode until the new/updated security information is downloaded (and optionally acted upon).

Alternatively, the security information may be time-limited, and the device may need to re-download new/updated security information. In embodiments, this may comprise placing the device back in the quarantine mode until the new/updated security information is downloaded (and optionally acted upon).

In an alternative example, the downloading of the security information may be triggered not on first power up but by user action. Additional security can be provided at the device level, for example in the software.

Those skilled in the art will understand that the above examples are presented by way of example only and that features described with respect to one example may be combined with those of other examples. Further, although the above description relates to a device operating using GSM, the same principles will apply to other mobile standards such as 4G, 5G, EDGE, or indeed any other mobile standard allowing data connections. For this reason, the gateway that is referred to as a GGSN 28 in the GSM standard may also be a corresponding access point or gateway according to other standards as required.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that disclosed methods are preferably computer-implemented methods. As such, there is also proposed the concept of computer program comprising code means for implementing any described method when said program is run on a processing system, such as a computer.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the internet or other wired or wireless telecommunication systems. If the term "adapted to" is used in the claims or description, it is noted the term "adapted to" is intended to be equivalent to the term "configured to". Any reference signs in the claims should not be construed as limiting the scope.

What is claimed is:

1. A method of distributing, to a device, security information designed for encrypting end-to-end communication between the device and an end server, wherein the device comprises a subscriber identity module (SIM) and a module that stores a first key, the method comprising:
    sending an authentication message from the device to a home location register over a mobile network, wherein the authentication message comprises SIM identifying information, for identifying the SIM, and device identifying data associated with the device; and
    triggering, by the authentication message, steps of:
        registering the device on the mobile network based on the SIM identifying information;
        downloading of security information to the SIM over one or more signaling channels of the mobile network;
        storing the security information in the SIM; and
        modifying one or more of the SIM or the security information, based on the device identifying data contained in the authentication message, so that one or more of accessing or decrypting the security information stored by the SIM requires the first key.

2. The method of claim 1, wherein the step of triggering the downloading of security information comprises:
    triggering a generation of configuration data comprising the security information and SIM configuration data, the SIM configuration data being based upon the device identifying data; and
    triggering the downloading of the SIM configuration data, wherein the step of modifying the one or more of the SIM or the security information comprises modifying the SIM, using the SIM configuration data, so that accessing the stored security information requires the first key.

3. The method of claim 2, wherein the step of modifying the SIM comprises modifying a read permission of the SIM to permit access to modules having an administrative (ADM) key, wherein the ADM key is obtainable using the first key.

4. The method of claim 2, wherein the module is further adapted to store a second, different key and the step of modifying the one or more of the SIM or the security information comprises encrypting the security information so that it can be decrypted using the second key.

5. The method of claim 1, wherein the step of modifying the SIM or the security information comprises encrypting the security information so that it can be decrypted using the first key.

6. The method of claim 1, wherein the module comprises a cellular modem of the device.

7. The method of claim 1, further comprising:
    accessing, using the module, the security information stored by the SIM using the first key; and
    storing the accessed security information in the module.

8. The method of claim 7, further comprising, after storing the accessed security information in the module, deleting the security information from the SIM.

9. The method of claim 7, further comprising:
    after storing the security information in the module, using the module to attempt to contact the end server, wherein the attempt to contact is based upon the security information; and
    in response to successfully contacting the end server, deleting the security information from the SIM.

10. The method of claim 1, wherein the step of modifying the one or more of the SIM or the security information comprises:
    accessing a database that correlates different instances of device identifying data to different first keys;
    using the database to identify the first key that correlates to the device identifying data contained in the authentication message; and
    modifying the one or more of the SIM or the security information based on the identified first key.

11. The method of claim 1, wherein the step of sending an authentication message from the device is performed on first power up of the device.

12. The method of claim 1, wherein the security information comprises at least one or more of: a security certificate, secure communications software, a private key, an encryption algorithm, server information, or server settings.

13. The method of claim 1, wherein the step of modifying the one or more of the SIM or the security information, based on the device identifying data, comprises modifying the SIM and/or the security information, based on the device identifying data, so that one or more of accessing or decrypting the security information stored by the SIM requires access to the first key and the SIM identifying information.

14. A mobile network system for distributing, to a device, security information designed for encrypting end-to-end communication between the device and an end server, the mobile network system comprising:
   the device comprising a subscriber identity module, SIM, and a module that stores a first key;
   a home location register;
   an access point connected to a network having an end server; and
   wherein the device is adapted to:
   send an authentication message to the home location register, wherein the authentication message comprises SIM identifying information, for identifying the SIM, and device identifying data associated with the device;
   download the security information to the SIM over one or more signaling channels of a mobile network;
   wherein the mobile network system is adapted to trigger, by the authentication message:
      a registration of the device on the mobile network based on the SIM identifying information;
      a downloading of security information to the SIM over one or more signaling channels of the mobile network;
      a modification of one or more of the SIM or the security information, based on the device identifying data contained in the authentication message, so that one or more of accessing or decrypting the security information stored by the SIM requires the first key.

15. The mobile network system of claim 14, wherein the module comprises a cellular modem of the device.

16. The mobile network system of claim 14, wherein the triggering of downloading of security information further comprises:
   triggering a generation of configuration data comprising the security information and SIM configuration data, the SIM configuration data being based upon the device identifying data; and
   triggering a downloading of the SIM configuration data, wherein the step of modifying the one or more of the SIM or the security information comprises modifying the SIM, using the SIM configuration data, so that accessing the stored security information requires the first key.

17. The mobile network system of claim 16, wherein the step of modifying the SIM comprises modifying a read permission of the SIM to permit access to modules having an administrative (ADM) key, wherein the ADM key is obtainable using the first key.

18. The mobile network system of claim 16, wherein the module is further adapted to store a second, different key and the step of modifying the one or more of the SIM or the security information comprises encrypting the security information so that it can be decrypted using the second key.

19. The mobile network system of claim 14, wherein the step of modifying the one or more of the SIM or the security information comprises encrypting the security information so that it can be decrypted using the first key.

20. The mobile network system of claim 14, wherein the step of modifying the one or more of the SIM or the security information comprises:
   accessing a database that correlates different instances of device identifying data to different first keys;
   using the database to identify the first key that correlates to the device identifying data contained in the authentication message; and
   modifying the one or more of the SIM or the security information based on the identified first key.

* * * * *